US012743659B2

(12) United States Patent
Zhang et al.

(10) Patent No.: US 12,743,659 B2
(45) Date of Patent: Sep. 22, 2026

(54) METHOD AND SYSTEM FOR OBTAINING CONDITIONAL DEMOGRAPHIC PARITY THROUGH OPTIMAL TRANSPORT IN DATA-DRIVEN MODEL

(71) Applicant: JPMorgan Chase Bank, N.A., New York, NY (US)

(72) Inventors: Luhao Zhang, Manor, TX (US); Mohsen Ghassemi, Jersey City, NJ (US); Ivan Brugere, Palo Alto, CA (US); Niccolo Dalmasso, Long Island City, NY (US); Alan Mishler, Pittsburgh, PA (US); Vamsi Krishna Potluru, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 805 days.

(21) Appl. No.: 18/119,022

(22) Filed: Mar. 8, 2023

(65) Prior Publication Data

US 2024/0303532 A1 Sep. 12, 2024

(51) Int. Cl.
*G06N 20/00* (2019.01)

(52) U.S. Cl.
CPC .................................... *G06N 20/00* (2019.01)

(58) Field of Classification Search
CPC ................................. G06N 20/00; G06N 5/01
See application file for complete search history.

(56) References Cited

U.S. PATENT DOCUMENTS 11,374,952 B1 * 6/2022 Coskun ............... H04L 63/1416
2024/0419939 A1 * 12/2024 Chen .................... G06N 3/0464

OTHER PUBLICATIONS

Backhoff et al., “Causal transport in discrete time and applications,” 2017, arXiv:1606.04062v2 (Year: 2017).*
Xu et al., “Algorithmic Decision Making with Conditional Fairness,” 2021, arXiv:2006.10483v5 (Year: 2021).*
Hardt et al., “Equality of Opportunity in Supervised Learning,” 2016, arXiv:1610.02413v1 (Year: 2016).*
Yeng et al., “Decision-making with Side Information: A Causal Transport Robust Approach,” 2022, https://optimization-online.org/?p =20639 (Year: 2022).*

(Continued)

*Primary Examiner* — Michael J Huntley
*Assistant Examiner* — Vincent Anton Spraul
(74) *Attorney, Agent, or Firm* — Greenblum & Bernstein, P.L.C.

(57) ABSTRACT

A method and a system for obtaining conditional demographic parity in the construction of a data-driven model are provided. The method includes: identifying features associated with the model; determining a first joint distribution of model outputs and a feature based on a first level of a particular one of the features and a second joint distribution of model outputs and a feature based on a second level of the particular feature; computing a bi-causal transport distance between the first joint distribution and the second joint distribution; computing a regularizer based on the bi-causal transport distance; and applying the regularizer to the model.

18 Claims, 5 Drawing Sheets

(56) References Cited

OTHER PUBLICATIONS

Kwegyir-Aggrey et al., "Everything is Relative: Understanding Fairness with Optimal Transport," 2021, arXiv:2102.10349v1 (Year: 2021).*

Wachter et al., "Why fairness cannot be automated: Bridging the gap between EU non-discrimination law and AI," 2021, https://doi.org/10.1016/j.clsr.2021.105567 (Year: 2021).*

* cited by examiner

500

Algorithm 1: Nested Sinkhorn iteration of the bi-causal distance $C_b^p(\mathbb{P}_0, \mathbb{P}_1)$

Input : The distribution $\mathbb{P}_0, \mathbb{P}_1$ by specifying $x_0^m, y_0^i, p_0^i, x_1^n, y_1^j, p_1^j$ for $m \in \mathcal{N}_0^X, i \in \mathcal{N}_0^Y$, $n \in \mathcal{N}_1^X, j \in \mathcal{N}_1^Y$, and regularization parameter $\lambda > 0$.

Output : Bi-causal distance between the two distributions $\mathbb{P}_0$ and $\mathbb{P}_1$.

for every combination of nodes $m \in \mathcal{N}_0^X, n \in \mathcal{N}_1^X$ do

For all combination of leaf nodes $i \in \mathcal{N}_0^Y$ and $j \in \mathcal{N}_1^Y$ with predecessor $m \prec i$ and $n \prec j$:

$$d_Y(i,j)^p = |x_0^m - x_1^n|^p + |y_0^i - y_1^j|^p$$

solve the linear program $$\gamma_Y^*(m,n)^p = \min_{\gamma_Y} \sum_{\substack{i \succ m \\ j \succ n}} \gamma_Y(i,j|m,n) d_Y(i,j)^p - \frac{1}{\lambda} H(\gamma_Y) \quad (7)$$

$$\text{subject to} \sum_{j \succ n} \gamma_Y(i,j|m,n) = q_0^i, \quad i \succ m, \quad (8)$$

$$\sum_{i \succ m} \gamma_Y(i,j|m,n) = q_1^j, \quad j \succ n, \quad (9)$$

$$\gamma_Y(i,j|m,n) \geq 0. \quad (10)$$

end solve the linear program $$\min_{\gamma_X} \sum_{\substack{i \succ m \\ j \succ n}} \gamma_X(m,n) \gamma_Y^*(m,n)^p - \frac{1}{\lambda} H(\gamma_X) \quad (11)$$

$$\text{subject to} \sum_{j \succ n} \gamma_X(m,n) = p_0^m, \quad i \succ m, \quad (12)$$

$$\sum_{i \succ m} \gamma_X(m,n) = p_1^n, \quad j \succ n, \quad (13)$$

$$\gamma_X(m,n) \geq 0. \quad (14)$$

return The bi-causal distance between $\mathbb{P}_0$ and $\mathbb{P}_1$ is the $p$-th root of the optimal value of (11).

FIG. 5

METHOD AND SYSTEM FOR OBTAINING CONDITIONAL DEMOGRAPHIC PARITY THROUGH OPTIMAL TRANSPORT IN DATA-DRIVEN MODEL

BACKGROUND

1. Field of the Disclosure

This technology generally relates to methods and systems for constructing data-driven models that are invariant with respect to demographic features, and more particularly to methods and systems for obtaining conditional demographic parity through optimal transport in the construction of a data-driven model.

2. Background Information

Algorithmic, data-driven decision-making has an increasing impact on the lives of individuals, in areas such as consumer finance, health insurance, and hiring. Work in algorithmic group-fairness assumes that decisions by a data-driven model ought to be invariant to the group membership of individuals for some protected and/or sensitive feature(s) of interest, such as race, gender, national origin, or disability status. There are many ways of quantifying this invariance; each such quantification constitutes a particular fairness measure. The violation of a particular fairness measure is typically referred to as the group disparity of a model, relative to that measure. This general premise has yielded fairness-aware artificial intelligence (AI) in many specialized applications and under several fairness measures.

Among the myriad of fairness definitions in the literature, many are mutually unsatisfiable in practice. Demographic parity (DP; also referred to herein as "statistical parity") requires marginal independence between a sensitive feature and an algorithm output. Although this is a widely discussed fairness definition, it is coarse enough that it may mask intuitively unfair behavior.

Demographic parity may fail to capture intuitive notions of fairness and unfairness in the presence of data exhibiting Simpson's paradox, i.e., where a correlation exists on subsets of data but is not present or reverses sign when the subsets are combined. For example, in one gender bias study, it is shown that there was an appearance of an admission bias against women, who applied to more selective departments at a university. However, within each department, women were selected at similar rates as male applicants. Over time, decision systems which satisfy demographic parity can even lead to worse outcomes for a particular group, or greater disparities between different groups.

Conditional demographic parity (CDP) addresses some of these issues by requiring independence of algorithm outputs from demographic features within strata of a set of "legitimate" risk factors. For example, conditional statistical parity might require independence of an admission algorithm's output from gender conditional on grade point average (GPA), so that high-GPA males and females must be admitted at equal rates, and likewise for low-GPA males and females.

There have been many works that develop methods to satisfy DP, but very few deal explicitly with CDP. Some methods for satisfying DP can be adapted to satisfy CDP, but in many instances these adaptations are only feasible when the legitimate features are discrete with a small number of total levels, and/or when the algorithm output is binary. For example, methods which use a constraint or a regularization term to penalize the difference in predictive distributions for two groups would have to add a corresponding term for every level of the legitimate features in order to target CDP.

Accordingly, there is a need for a method for obtaining conditional demographic parity in the construction of a data-driven model.

SUMMARY

The present disclosure, through one or more of its various aspects, embodiments, and/or specific features or sub-components, provides, inter alia, various systems, servers, devices, methods, media, programs, and platforms for methods and systems for obtaining conditional demographic parity through optimal transport in the construction of a data-driven model.

According to an aspect of the present disclosure, a method for optimizing conditional demographic parity in a machine learning model is provided. The method is implemented by at least one processor. The method includes: identifying, by the at least one processor, at least one feature associated with data that is inputted into the model; determining, by the at least one processor, a first joint distribution of model outputs and a second feature from among the at least one feature based on a first level of a first feature from among the at least one feature and a second joint distribution of model outputs and the second feature based on a second level of the first feature; computing, by the at least one processor, a bi-causal transport distance between the first joint distribution and the second joint distribution; computing, by the at least one processor based on the bi-causal transport distance, a regularizer that reduces the conditional demographic disparity; and applying, by the at least one processor, the regularizer to the model.

The method may further include calculating a conditional demographic disparity between the first joint distribution and the second joint distribution with respect to the first feature.

The calculating of the conditional demographic disparity may include calculating a Kolmogorov distance between the first joint distribution and the second joint distribution.

The computing of the bi-causal transport distance may include estimating a nested Wasserstein distance between the first joint distribution and the second joint distribution by applying a Sinkhorn divergence algorithm to a set of samples of each of the first distribution and the second distribution.

The model may be configured to use an artificial intelligence technique for making a decision based on input data that relates to a person. The decision may relate to at least one from among a consumer finance question, a health insurance question, and a hiring question.

The first feature may include at least one from among race, gender, national origin, and disability.

The second feature may include one from among a level of education, a grade point average (GPA), and a level of income.

According to another exemplary embodiment, a computing apparatus for optimizing conditional demographic parity in a machine learning model is provided. The computing apparatus includes a processor; a memory; and a communication interface coupled to each of the processor and the memory. The processor is configured to: identify at least one feature associated with data that is inputted into the model; determine a first joint distribution of model outputs and a second feature from among the at least one feature based on a first level of a first feature from among the at least one feature and a second joint distribution of model outputs and the second feature based on a second level of the first feature; compute a bi-causal transport distance between the first joint distribution and the second joint distribution; compute, based on the bi-causal transport distance, a regularizer that reduces the conditional demographic disparity; and apply the regularizer to the model.

The processor may be further configured to calculate a conditional demographic disparity between the first joint distribution and the second joint distribution with respect to the first feature.

The processor may be further configured to calculate the conditional demographic disparity by calculating a Kolmogorov distance between the first joint distribution and the second joint distribution.

The processor may be further configured to compute the bi-causal transport distance by estimating a nested Wasserstein distance between the first joint distribution and the second joint distribution by applying a Sinkhorn divergence algorithm to a set of samples of each of the first joint distribution and the second joint distribution.

The model may be configured to use an artificial intelligence technique for making a decision based on input data that relates to a person. The decision may relate to at least one from among a consumer finance question, a health insurance question, and a hiring question.

The first feature may include at least one from among race, gender, national origin, and disability.

The second feature may include one from among a level of education, a grade point average (GPA), and a level of income.

According to yet another exemplary embodiment, a non-transitory computer readable storage medium storing instructions for optimizing conditional demographic parity in a machine learning model is provided. The storage medium includes executable code which, when executed by a processor, causes the processor to: identify at least one feature associated with data that is inputted into the model; determine a first joint distribution of model outputs and a second feature from among the at least one feature based on a first level of a first feature from among the at least one feature and a second joint distribution of model outputs and the second feature based on a second level of the first feature; compute a bi-causal transport distance between the first joint distribution and the second joint distribution; compute, based on the bi-causal transport distance, a regularizer that reduces the conditional demographic disparity; and apply the regularizer to the model.

When executed by the processor, the executable code may further cause the processor to calculate a conditional demographic disparity between the first joint distribution and the second joint distribution with respect to the first feature.

When executed by the processor, the executable code may further cause the processor to calculate the conditional demographic disparity by calculating a Kolmogorov distance between the first joint distribution and the second joint distribution.

When executed by the processor, the executable code may further cause the processor to compute the bi-causal transport distance by estimating a nested Wasserstein distance between the first joint distribution and the second joint distribution by applying a Sinkhorn divergence algorithm to a set of samples of each of the first joint distribution and the second joint distribution so as to optimize a trade-off between prediction loss and unfairness associated with the model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is an algorithm for computing a nested Sinkhorn divergence as part of an exemplary process for implementing a method for obtaining conditional demographic parity in the construction of a data-driven model.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
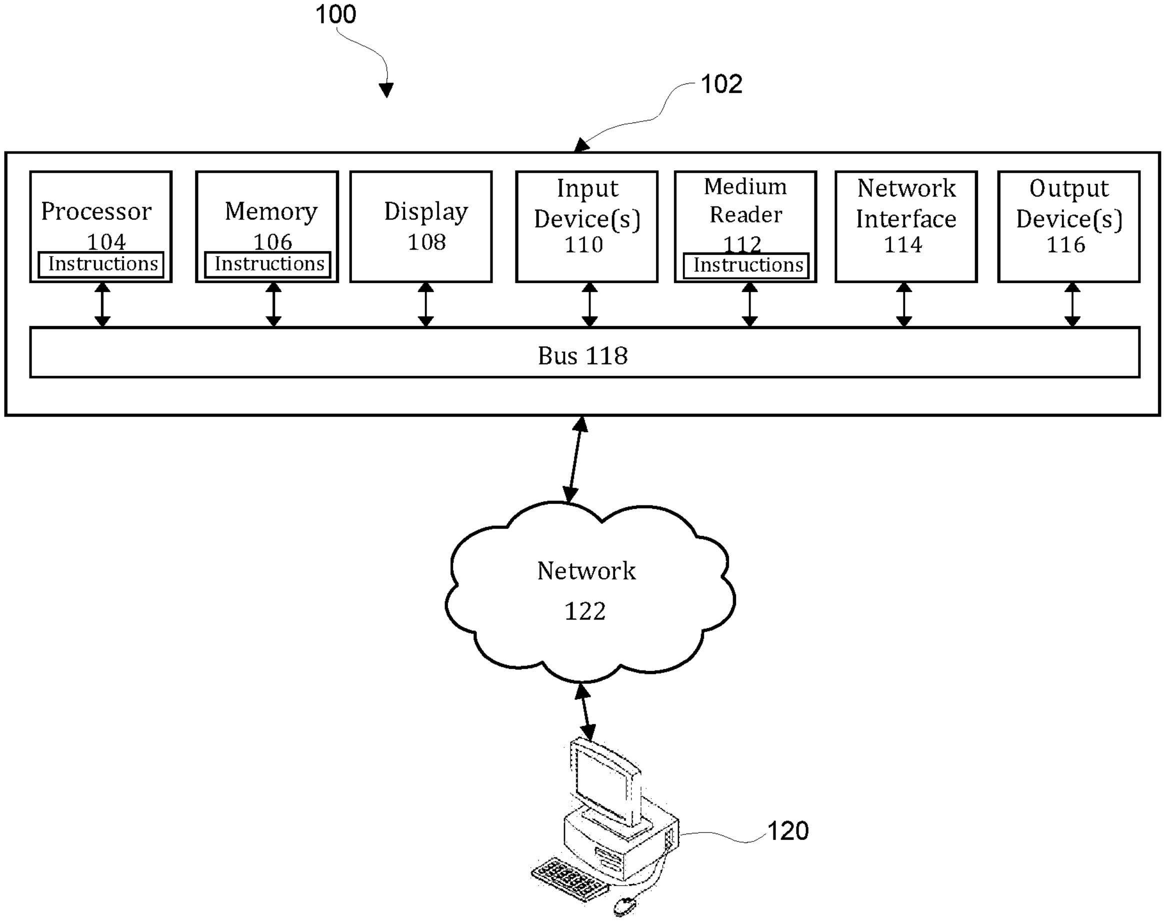
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for obtaining conditional demographic parity through optimal transport in the construction of a data-driven model.

Figure 2:
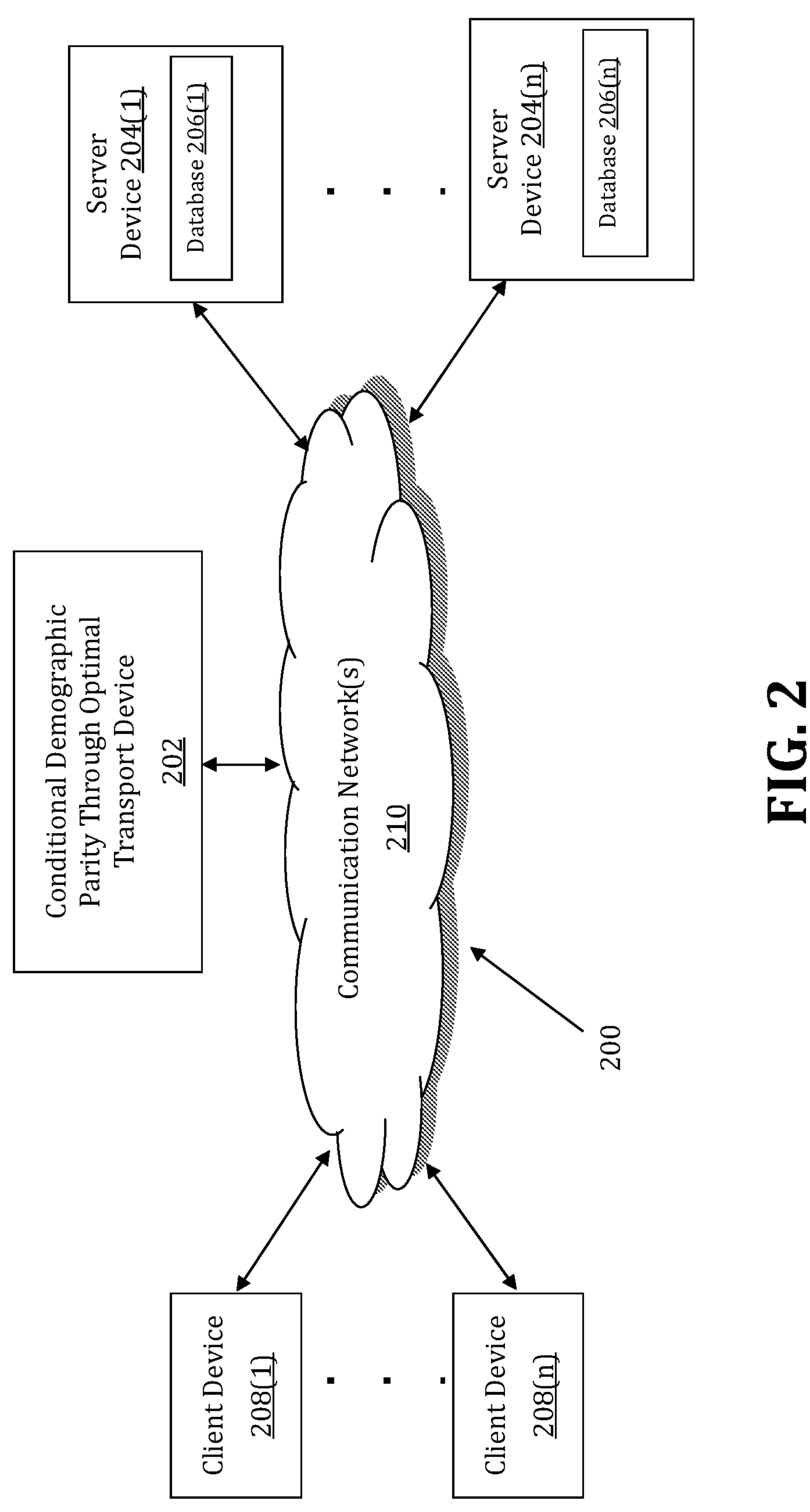
FIG. 2 illustrates an exemplary diagram of a network environment.

Referring to FIG. 2, a schematic of an exemplary network environment 200 for implementing a method for obtaining conditional demographic parity through optimal transport in the construction of a data-driven model is illustrated. In an exemplary embodiment, the method is executable on any networked computer platform, such as, for example, a personal computer (PC).

The method for obtaining conditional demographic parity through optimal transport in the construction of a data-driven model may be implemented by a Conditional Demographic Parity Through Optimal Transport (CDPTOT) device 202. The CDPTOT device 202 may be the same or similar to the computer system 102 as described with respect to FIG. 1. The CDPTOT device 202 may store one or more applications that can include executable instructions that, when executed by the CDPTOT device 202, cause the CDPTOT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDPTOT device 202 itself, may be located in virtual server(s) running in a cloud-based computing environment rather than being tied to one or more specific physical network computing devices. Also, the application(s) may be running in one or more virtual machines (VMs) executing on the CDPTOT device 202. Additionally, in one or more embodiments of this technology, virtual machine(s) running on the CDPTOT device 202 may be managed or supervised by a hypervisor.

In the network environment 200 of FIG. 2, the CDPTOT device 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the CDPTOT device 202, such as the network interface 114 of the computer system 102 of FIG. 1, operatively couples and communicates between the CDPTOT device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDPTOT device 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and CDPTOT devices that efficiently implement a method for obtaining conditional demographic parity through optimal transport in the construction of a data-driven model.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDPTOT device 202 may be a standalone device or integrated with one or more other devices or apparatuses, such as one or more of the server devices 204(1)-**204(*n*), for example. In one particular example, the CDPTOT device 202 may include or be hosted by one of the server devices 204(1)-204(*n*), and other arrangements are also possible. Moreover, one or more of the devices of the CDPTOT device 202** may be in a same or a different communication network including one or more public, private, or cloud networks, for example.

The plurality of server devices 204(1)-**204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the CDPTOT device 202 via the communication network(s) 210** according to the HTTP-based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store historical information that relates to demographic distributions in various groups and information that relates to metrics for demographic disparity and/or unfairness.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the CDPTOT device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208** is a wireless mobile communication device, i.e., a smart phone.

The client devices **208(1)-208(*n*) may run interface applications, such as standard web browsers or standalone client applications, which may provide an interface to communicate with the CDPTOT device 202 via the communication network(s) 210 in order to communicate user requests and information. The client devices 208(1)-208(*n*)** may further include, among other features, a display device, such as a display screen or touchscreen, and/or an input device, such as a keyboard, for example.

Although the exemplary network environment 200 with the CDPTOT device 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDPTOT device 202, the server devices **204(1)-204(*n*), or the client devices 208(1)-208(*n*), for example, may be configured to operate as virtual instances on the same physical machine. In other words, one or more of the CDPTOT device 202, the server devices 204(1)-204(*n*), or the client devices 208(1)-208(*n*) may operate on the same physical device rather than as separate devices communicating through communication network(s) 210. Additionally, there may be more or fewer CDPTOT devices 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
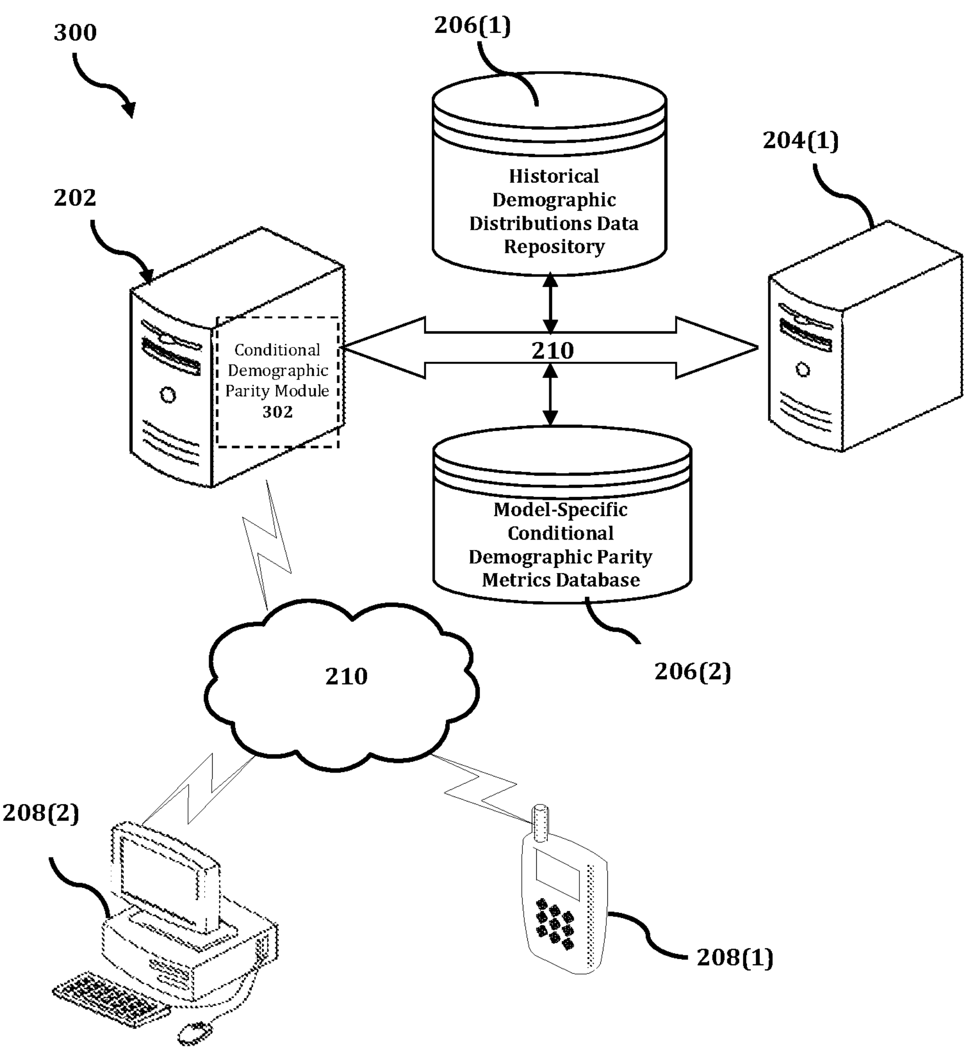
FIG. 3 shows an exemplary system for implementing a method for obtaining conditional demographic parity in the construction of a data-driven model.

The CDPTOT device 202 is described and illustrated in FIG. 3 as including a conditional demographic parity module 302, although it may include other rules, policies, modules, databases, or applications, for example. As will be described below, the conditional demographic parity module 302 is configured to implement a method for obtaining conditional demographic parity through optimal transport in the construction of a data-driven model.

An exemplary process 300 for implementing a mechanism for obtaining conditional demographic parity through optimal transport in the construction of a data-driven model by utilizing the network environment of FIG. 2 is illustrated as being executed in FIG. 3. Specifically, a first client device 208(1) and a second client device 208(2) are illustrated as being in communication with CDPTOT device 202. In this regard, the first client device 208(1) and the second client device 208(2) may be "clients" of the CDPTOT device 202 and are described herein as such. Nevertheless, it is to be known and understood that the first client device 208(1) and/or the second client device 208(2) need not necessarily be "clients" of the CDPTOT device 202, or any entity described in association therewith herein. Any additional or alternative relationship may exist between either or both of the first client device 208(1) and the second client device 208(2) and the CDPTOT device 202, or no relationship may exist.

Further, CDPTOT device 202 is illustrated as being able to access a historical demographic distributions data repository 206(1) and a model-specific conditional demographic parity metrics database 206(2). The conditional demographic parity module 302 may be configured to access these databases for implementing a method for obtaining conditional demographic parity through optimal transport in the construction of a data-driven model.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CDPTOT device 202 via broadband or cellular communication. Of course, these embodiments are merely exemplary and are not limiting or exhaustive.

Upon being started, the conditional demographic parity module 302 executes a process for obtaining conditional demographic parity through optimal transport in the construction of a data-driven model. An exemplary process for obtaining conditional demographic parity through optimal transport in the construction of a data-driven model is generally indicated at flowchart 400 in FIG. 4.

Figure 4:
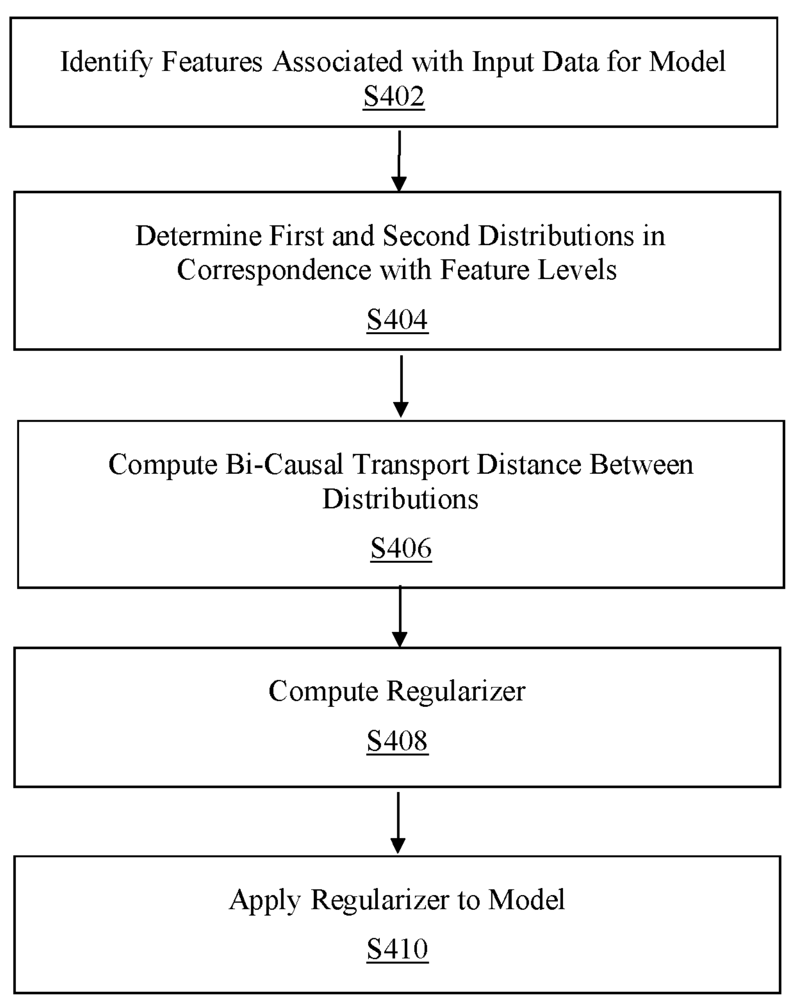
FIG. 4 is a flowchart of an exemplary process for implementing a method for obtaining conditional demographic parity in the construction of a data-driven model.

In process 400 of FIG. 4, at step S402, the conditional demographic parity module 302 identifies features that are associated with data that is to be used as input for a machine learning (ML) model for which it is desired to achieve conditional demographic parity. In an exemplary embodiment, the features include demographic categories for which conditional demographic parity is desirable (also referred to herein as "sensitive" features), such as, for example, any one or more of race, gender, national origin, and/or disability. In an exemplary embodiment, the features also include features that are generally deemed as being legitimate factors for distinguishing among individuals with respect to merit-based decisions (also referred to herein as "legitimate" features), such as, for example, any one or more of personality type, level of education, grade point average (GPA) and/or income level.

In an exemplary embodiment, the ML model is configured to use an artificial intelligence (AI) technique for making a decision based on input data that relates to a person. In an exemplary embodiment, the decision may relate to any one or more of a consumer finance question, such as whether to approve a request for credit; a health insurance question, such as whether the person qualifies for a particular health insurance policy; and/or a hiring question, such as whether or not to make an employment offer to the person.

At step S404, the conditional demographic parity module 302 determines a first joint distribution of model outputs and sensitive feature(s) that correspond to a first level of a specific feature and at least a second joint distribution of model outputs and sensitive feature(s) that correspond to a second level of the specific feature. In an exemplary embodiment, the specific feature is selected from among the legitimate features identified in step S402 as being a feature for which it is desired to make a decision in an unbiased manner with respect to the sensitive features. For example, the specific feature may include any one or more of education level, GPA, and/or income level, and it may be desirable to minimize a probability that the decision being made by the ML model is biased based on a sensitive feature such as race, gender, national origin, and/or disability. In addition, in an exemplary embodiment, there may be a third joint distribution of model outputs and sensitive feature(s) that correspond to a third level of the specific feature, a fourth joint distribution that corresponds to a fourth level, and/or any other number of joint distributions that respectively correspond to additional levels of the specific feature.

For example, when the specific feature is GPA, the conditional demographic parity module 302 may determine a first level as being a grouping of relatively high GPAs and a second level as being a grouping of relatively low GPAs, and the first and second joint distributions of model outputs and sensitive features are determined with respect to those two groupings. Alternatively, a third level may be determined as being a grouping of medium GPAs that are lower than the GPAs in the high-GPA group and higher than the GPAs in the low-GPA group. In this aspect, there is no specific limit to the number of levels of the specific feature.

At step S406, the conditional demographic parity module 302 computes a bi-causal transport distance between the joint distributions. In an exemplary embodiment, the computation of the bi-causal transport distance is performed by estimating a nested Wasserstein distance between the first joint distribution and the second joint distribution, or between any pair of joint distributions. In an exemplary embodiment, the nested Wasserstein distance may be estimated by applying a Sinkhorn divergence algorithm to a set of samples of each joint distribution.

At step S408, the conditional demographic parity module 302 uses the bi-causal transport distance to compute a regularizer that reduces the conditional demographic disparity. Then, at step S410, the conditional demographic parity module 302 applies the regularizer to the ML model in order to optimize conditional demographic parity with respect to the specific feature.

In an exemplary embodiment, the conditional demographic parity module 302 may additionally calculate a conditional demographic disparity between the joint distributions. In an exemplary embodiment, this calculation may be performed by calculating a Kolmogorov distance between the first joint distribution and the second joint distribution, or between any pair of joint distributions.

In an exemplary embodiment, a regularization-based approach for imposing conditional demographic parity in supervised learning problems is disclosed herein. While many methods exist for achieving demographic parity, conditional demographic parity can be much more challenging to achieve, especially when the conditioning variables are continuous or discrete with many levels. In an exemplary embodiment, the regularization approach is based on a probability distribution distance that is referred to herein as a bi-causal transport distance. The method utilizes a single regularization term for which the computational cost is expressible as $O(n^2)$ in the sample size, regardless of the dimension of the conditioning variables or whether those variables are continuous or discrete. In an exemplary embodiment, one objective of this approach is to ensure full independence of the conditional distributions, rather than only targeting the first moments thereof. In this aspect, the method allows a user to control a tradeoff between model accuracy and a level of fairness; in general, it will satisfy conditional demographic parity approximately, rather than perfectly.

In an exemplary embodiment, $\mathcal{X}$ is a metric space that represents a set of features, $X \in \mathcal{X}$ is a feature level, $Y \in \mathbb{R}$ is the output of the model, $A \in \{0, 1\}$ is a sensitive feature, and $f: \mathcal{X} \rightarrow \mathbb{R}$ is the model, for which it is an objective to measure the fairness and/or unfairness of the model. For convenience, the expression $f(X)$ is referred to herein as a "decision rule," noting that $f(X)$ may also be understood as a predictor or any other type of algorithm which generates outputs that may be represented by real numbers.

Demographic parity: Decision rule $f(X)$ satisfies demographic parity if $\mathbb{P}(f(X)|A=0)=\mathbb{P}(f(X)|A=1)$, or, in other words, when $f(X)$ is independent of A, i.e., $f(X) \perp\!\!\!\perp A$.

In order to measure how far $f(X)$ is from satisfying demographic parity, the corresponding demographic disparity is also defined.

Demographic disparity: Let d (•, •) denote a distance between distributions on $\mathbb{R}$. The demographic disparity for decision rule f(X) with respect to dis defined by $$d(\mathbb{P}_{f(X)|A=0}, \mathbb{P}_{f(X)|A=1}). \quad (1),$$

where d( ) represents a chosen distributional distance.

In this aspect, the demographic disparity is the distance between the conditional distributions of f(X) for the two groups represented by the sensitive feature.

For example, one choice of d is the Kolmogorov distance. Then the disparity is $\epsilon$ if $$|\mathbb{P}(f(X) \le \tau \mid A = 0) - \mathbb{P}(f(X) \le \tau \mid A = 1)| \le \varepsilon, \quad (2),$$

for every $\tau \in \mathbb{R}$, or in other words if the difference between cumulative distribution functions (CDFs) of the two conditional distributions are uniformly bounded by $\epsilon$. Notice that $\epsilon=0$ if and only if f(X) satisfies demographic parity.

It is noted that when f(X) is binary, equalizing the first moments of f(X) is equivalent to satisfying demographic parity, but if f(X) is continuous, then it may behave quite differently for the two groups, even when the means of the two conditional distributions are equal. In this aspect, the disparity is defined via distributional distances, in order to allow for minimizing the discrepancy between the entire distributions, not just the means.

The choice of distance function d in practice may depend on the problem setting. For example, minimizing the Kolmogorov distance in some sense requires fairness across all parts of the distribution of f(X). In some settings, this may be ethically appropriate, while in others it may be unnecessary and might incur an unacceptable trade-off in performance.

Demographic disparity may be a misleading measure of unfairness in certain scenarios. For example, consider a college admissions setting, and suppose for simplicity that the admissions committee only has access to the sex and the GPA of each applicant. A decision rule which admits the top 5% of male students and the bottom 5% of female students would satisfy demographic parity, but it would seem to be obviously unfair to top female students and may result in poor academic performance for females as a group, which could then be used to justify future discrimination. Consider another scenario in which every female candidate has a higher GPA than all male candidates. Any decision rule admitting an equal number of male and female candidates again satisfies demographic parity, but may be regarded as unfair to the rejected female candidates. In this setting, an intuitively fairer thing to do is to require independence of the decision on gender only for candidates with the same level of GPA, i.e., it is desirable that a male and a female with the same GPA should have the same chance of being admitted.

These examples show that in some cases, in order to fully specify the two groups, it is required that not only the protected feature (e.g., gender) be specified, but also the "legitimate" feature(s) (e.g., GPA) must also be specified when considering group fairness. This motivates conditional demographic parity as a more reasonable measure of fairness in such scenarios.

Conditional demographic parity: Let L represent a set of legitimate features. The decision rule f(X) satisfies conditional demographic parity with respect to L when $f(X) \perp\!\!\!\perp A|L=l$ for all $l \in \text{supp}\,\mathbb{P}(L|A=0) \cap (\text{supp}\,\mathbb{P}(L|A=1)$.

The conditional demographic disparity is more complicated to define than the demographic disparity because this definition accounts for the distance in conditional distributions for each possible level $\ell$ of the legitimate features.

Conditional demographic disparity: Let d (•, •) denote a distance between distributions. For the set of legitimate features L, the conditional demographic disparity D is defined as follows:

$$D(l) := \begin{cases} d(\mathbb{P}(f(X) \mid L = l, A = 0), \mathbb{P}(f(X) \mid L = l, A = 1)), & l \in \mathcal{S} \\ 0 & \text{otherwise} \end{cases}$$

$$\text{where } \mathcal{S} = supp\mathbb{P}(L \mid A = 0) \cap supp\mathbb{P}(L \mid A = 1).$$

The conditional demographic disparity with order $p \in [1, \infty)$ of the decision rule f(X) is defined as $$\|D\|_{L^p}\left(\mathcal{L}; \frac{\mathbb{P}(L \mid A = 0) + \mathbb{P}(L \mid A = 1)}{2}\right).$$

In other words, the disparity is the $L^P$ norm of the distances between the conditional distributions defined by levels $\ell$ of legitimate features, where the associated measure is the average of the two conditional distributions $$\mathbb{P}(L \mid A = 0) \text{ and } \mathbb{P}(L \mid A = 1).$$

For example, if d (•, •) is the Kolmogorov distance and $p=\infty$, then the conditional demographic disparity of f(X) is e if for all $$l \in supp\,\mathbb{P}(L \mid A = 0) \cap supp\,\mathbb{P}(L \mid A = 1), \quad (3)$$
$$|\mathbb{P}(f(X) \le \tau \mid L = l, A = 0) - \mathbb{P}(f(X) \le \tau \mid L = l, A = 1)| \le \varepsilon,$$

or in other words, if the Kolmogorov distance for the two distributions is not greater than $\epsilon$ for every possible level $\ell$.

Once again, different distance functions d induce different notions of disparity, as do different values of p in the $L^P$ norm. Setting $p=\infty$ and enforcing a small corresponding disparity requires the decision rule f(X) to behave similarly for the two groups within every level $\ell$, whereas setting p to, for example, 2, allows f(X) to potentially behave quite differently for the two groups over areas of L with small measure. Which type of behavior is appropriate will depend on the ethical considerations in a given problem setting.

Optimal transport and bi-causal transport distance: A fundamental problem in fairness is to determine useful measures of distance between pairs of probability distributions given a selected protected feature A. In an exemplary embodiment, conditional demographic parity is achieved through bi-causal transport distance, which is a distance that is defined via a constrained optimal transport problem. The optimal transport problem was originally formulated as the problem of transporting a distribution to another one while incurring minimal cost. In an exemplary embodiment, for probability measures $\tilde{\mathbb{P}}$, $\mathbb{P}$ on measure space $\mathcal{X} \times \mathbb{R}$, the set $\Gamma(\tilde{\mathbb{P}}, \mathbb{P})$ of transport plans denotes the collection of all probability measures on the space of $(\mathcal{X}\times\mathbb{R})\times(\mathcal{X}\times\mathbb{R})$ with marginals $\tilde{\mathbb{P}}$ and $\mathbb{P}$. Then for a cost function $C:((\mathcal{X}\times\mathbb{R})\times(\mathcal{X}\times\mathbb{R}))\to[0,\infty]$, the optimal transport problem is that of finding the optimal transport plan $\gamma^*$ that attains the infimum $$\inf_{\gamma\in(\tilde{\mathbb{P}},\mathbb{P})}\int_{(\mathcal{X}\times\mathbb{R})\times(\mathcal{X}\times\mathbb{R})} C((\tilde{x}, \tilde{y}), (x, y)d\gamma((\tilde{x}, \tilde{y}), (x, y)).$$

A common distance defined through optimal transport is the Wasserstein distance. For $\tilde{\mathbb{P}}$, $\mathbb{P}$ with finite p-th moment, the Wasserstein distance of order p is defined as $$\mathcal{W}_p^p(\tilde{\mathbb{P}}, \mathbb{P}) := \inf_{\gamma\in\Gamma(\tilde{\mathbb{P}},\mathbb{P})} \mathbb{E}_{(\tilde{X},\tilde{Y}),(X,Y)\sim\gamma}\left[\|\tilde{X}-X\|^p + \|\tilde{Y}-Y\|^p\right].$$

In an exemplary embodiment, the bi-causal transport distance, also referred to herein as the nested transport distance, is determined. The definition thereof may be understood as a bi-causal transport plan, and may be defined through the above framework with a constrained set of transport plans $\Gamma_c$ and $\Gamma_{bc}$, which are defined as follows:

Causal and bi-causal transport plan: A joint distribution $\gamma\in\Gamma(\tilde{\mathbb{P}}, \mathbb{P})$ is a causal transport plan if for $(\tilde{X},\tilde{Y})$, $(X,Y)\sim\gamma$, X and $\tilde{Y}$ are conditionally independent given $\tilde{X}$.

In an exemplary embodiment, $\Gamma_c(\tilde{\mathbb{P}}, \mathbb{P})$ denotes the set of all transport plans $\gamma\in\Gamma(\tilde{\mathbb{P}}, \mathbb{P})$ that are causal. Analogously, transport plans that are causal in both directions, or bi-causal, are considered. The set of all bi-causal transport plans may be expressed as follows:

$$\Gamma_{bc}(\tilde{\mathbb{P}}, \mathbb{P}) = \{\gamma\in\Gamma(\tilde{\mathbb{P}}, \mathbb{P}) \text{ s.t. for } ((\tilde{X}, \tilde{Y}), (X, Y))\sim\gamma, X \perp\!\!\!\perp \tilde{Y} \mid \tilde{X} \text{ and } \tilde{X} \perp\!\!\!\perp Y \mid X\}.$$

Bi-causal transport distance: The bi-causal transport distance between $\tilde{\mathbb{P}}$ and $\mathbb{P}$ is defined as follows:

$$C_b^p(\tilde{\mathbb{P}}, \mathbb{P}) := \inf_{\gamma\in\Gamma_{bc}(\tilde{\mathbb{P}},\mathbb{P})} \mathbb{E}_{((\tilde{X},\tilde{Y}),(X,Y))\sim\gamma}\left[\|\overline{X}-X\|^p + \|\tilde{Y}-Y\|^p\right] = \inf_{\gamma_1\in\Gamma(\tilde{\mathbb{P}}_{\tilde{X}},\mathbb{P}_X)} \mathbb{E}_{(\tilde{X},X)\sim\gamma_1}\left[\inf_{\gamma_2\in\Gamma(\tilde{\mathbb{P}}_{\tilde{Y}|\tilde{X}},\mathbb{P}_{Y|X})} \mathbb{E}_{(\tilde{Y},Y)\sim\gamma_2}\left[\|\tilde{X}-X\|^p + \|\tilde{Y}-Y\|^p \mid (\tilde{X}, X)\right]\right]$$

It follows from the definition of bi-causal transport distance that can be understood as a nested Wasserstein distance:

$$C_b^p(\tilde{\mathbb{P}}, \mathbb{P}) = \mathcal{W}_p^p(\tilde{\mathbb{P}}_{\tilde{X}}, \mathbb{P}_X; d),$$

$$\text{with metric } d^p(\tilde{X}, X) = \mathcal{W}_p^p(\tilde{\mathbb{P}}_{\tilde{Y}|\tilde{X}}, \mathbb{P}_{Y|X}) + \|\tilde{X}-X\|_p^p.$$

Conditional demographic parity through regularization: One approach to enforce conditional demographic parity is to use only legitimate features. However, this may result in a drop in performance compared to when all available features are used. It is frequently desirable for a practitioner to have a tunable knob for navigating the fairness-performance trade-off. In the context of risk minimization problems, this motivates employing regularizers that promote conditional demographic parity. However, a major deterrent in employing regularizers that promote closeness of conditional distributions is the high computational cost of calculating distances between pairs of conditional distributions when the legitimate features or the output are continuous or discrete with many levels. In an exemplary embodiment, this issue is addressed by employing a regularizer that is based on the bi-causal transport distance between pairs of joint distributions of the output and the legitimate features, rather than the conditional distributions. Calculating the bi-causal transport distance between joint distributions depends only on the square of the number of samples in the data set, and not the number of levels of the legitimate features, which means that this calculation can accommodate continuous legitimate features. This calculation also imposes closeness of the distributions, rather than only closeness of the first moments.

Empirical risk minimization (ERM) with conditional demographic parity regularization: In an exemplary embodiment, there is a focus on supervised learning problems that may be expressed according to the following form:

$$\min_{f\in\mathcal{F}} \mathbb{E}[\ell(f(X), Y)], \tag{4}$$

where $\ell$ is a loss function and F is the class of decision rules f under consideration, which take the form $f:\mathbb{X}\mapsto\mathbb{R}$.

Consideration is given to a case where the sensitive feature A has two levels $A\in\{0, 1\}$. For a limited set of legitimate risk factors L and a decision rule f, a regularizer is defined as follows:

$$\mathcal{B}(f) := C_b^p(\mathbb{P}((L, f(X)) \mid A = 0, \mathbb{P}((L, f(X)) \mid A = 1)),$$

i.e., the bi-causal transport distance between $$\mathbb{P}((L, f(X)) \mid A = 0) \text{ and } \mathbb{P}((L, f(X)) \mid A = 1).$$

By virtue of the expression for the nested Wasserstein distance provided above, it may be seen that the bi-causal transport distance $\mathcal{B}(f)$ dominates the Wasserstein distance between conditional distributions $$\mathbb{P}(f(X) \mid L, A = 0) \text{ and } \mathbb{P}(f(X) \mid L, A = 1)$$

in the $L^P$ sense. Hence, a small bi-causal transport distance between joint distributions implies similarity between conditional distributions. Moreover, when $$\mathcal{B}(f) = C_b^p(\mathbb{P}((L, f(X)) \mid A = 0), \mathbb{P}((L, f(X)) \mid A = 1) = 0, \text{ then}$$

$$\mathbb{P}(f(X) \le \tau \mid A = 0, L = l) = \mathbb{P}(f(X) \le \tau \mid A = 1, L = l) \text{ for}$$

$$\forall \tau \in \mathbb{R}, \forall l \in supp\ \mathbb{P}(L \mid A = 0) \cap supp\ \mathbb{P}(L \mid A = 1),$$

i.e., decision rule f achieves the conditional demographic parity. Based on this property, in an exemplary embodiment, $\mathcal{B}$(f) is employed as a regularizer in Equation (4) above to promote approximate conditional demographic parity. Therefore, in order to find an optimal trade-off between prediction loss and unfairness, an objective is to solve the following fair learning problem:

$$\min_{f_\theta \in \mathcal{F}} \mathbb{E}[\ell(f_\theta(X), Y)] + \lambda \mathcal{B}(f_\theta), \tag{5}$$

where λ>0 is a penalty parameter to encourage fairness. It is assumed that $\ell$ is convex and $\mathcal{F} = \{f_\theta : \theta \in \Theta\}$, where Θ is an open subset of Euclidean space, while the parametric decision rule $f_\theta(x)$ is Lipschitz continuous in x for every fixed θ and is Lipschitz continuous in θ for every fixed x. Assuming that there is an independent and identically distributed training sample $(X_i, Y_i, A_i)$, $i \in \{1, \ldots, N\}$ from some distribution $\mathbb{P}$ (X, Y, A), then the empirical risk minimization problem may be expressed as follows:

$$\min_{f_\theta \in \mathcal{F}} \frac{1}{N} \sum_{i=1}^{N} \ell(f_\theta(X_i), Y_i) + \lambda \mathcal{B}(f_\theta).$$

Efficient calculation of bi-causal transport distance: Computing the Wasserstein distance is computationally intractable. Therefore, in an exemplary embodiment, the Wasserstein distance is replaced by the Sinkhorn divergence, which is computationally efficient and corresponds to regularize the Wasserstein distance with an entropy term. In this formulation, because the bi-causal transport distance can be understood as a nested Wasserstein distance with two time periods, it may be computed through the nested Sinkhorn divergence. Referring to FIG. 5, in an exemplary embodiment, the nested Sinkhorn divergence may be computed by using Algorithm 1 as shown in illustration 500. Assuming that the observed samples $(X_i, Y_i, A_i)$, $i \in \mathbb{N}$ are independent and identically distributed samples from a stochastic process, the algorithm discretizes the whole space and filtration of the stochastic process (i.e., the whole feature space) using scenario trees and uses those to compute the optimal transport plan. The gradient may then be computed through the Sinkhorn divergence algorithm and propagated via stochastic gradient descent to minimize empirical risk.

In an exemplary embodiment, the Sinkhorn solver is used. The Sinkhorn solver has a time complexity that is approximately equal to $\mathcal{O}(n^2)$, and thus the nested algorithm has time complexity that may be expressed as follows:

$$K^2 + \sum_j \sum_k n_j n_k = K^2 + n^2 = O(n^2)$$

where $n_j$ is the number of samples with legitimate feature $l_j$ and all $n_j$'s are comparable, $$n = \sum_{k=1}^{K} n_k$$

is the sample size, and K is the number of levels that the legitimate features take in the training sample, and therefore, K<n.

Accordingly, with this technology, an optimized process for obtaining conditional demographic parity through optimal transport in the construction of a data-driven model is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for optimizing conditional demographic parity in a machine learning model, the method being implemented by at least one processor, the method comprising:

identifying, by the at least one processor, a plurality of features associated with data that is inputted into the model, wherein the plurality of features includes at least a first feature and a second feature, and wherein at least one of the plurality of features include a plurality of levels, each of the plurality of levels corresponding to a differing range of values;

determining, by the at least one processor, a first joint distribution of model outputs and the second feature based on a first level of the first feature and a second joint distribution of model outputs and the second feature based on a second level of the first feature;

computing, by the at least one processor, a bi-causal transport distance between the first joint distribution and the second joint distribution, wherein the bi-causal transport distance indicates conditional demographic disparity with respect to the first feature;

computing, by the at least one processor based on the bi-causal transport distance, a regularizer that reduces the conditional demographic disparity by at least applying a penalty parameter; and applying, by the at least one processor, the regularizer to the model to reduce the bi-causal transport distance between the first joint distribution and the second joint distribution for reducing the conditional demographic disparity.

2. The method of claim 1, further comprising calculating a conditional demographic disparity between the first joint distribution and the second joint distribution with respect to the first feature.

3. The method of claim 2, wherein the calculating of the conditional demographic disparity comprises calculating a Kolmogorov distance between the first joint distribution and the second joint distribution.

4. The method of claim 1, wherein the computing of the bi-causal transport distance comprises estimating a nested Wasserstein distance between the first joint distribution and the second joint distribution by applying a Sinkhorn divergence algorithm to a set of samples of each of the first joint distribution and the second joint distribution.

5. The method of claim 1, wherein the model is configured to use an artificial intelligence technique for making a decision based on input data that relates to a person, and wherein the decision relates to at least one from among a consumer finance question, a health insurance question, and a hiring question.

6. The method of claim 1, wherein the first feature includes at least one from among race, gender, national origin, and disability.

7. The method of claim 1, wherein the second feature includes one from among a level of education, a grade point average (GPA), and a level of income.

8. A computing apparatus for optimizing conditional demographic parity in a machine learning model, the computing apparatus comprising:

a processor;

a memory; and a communication interface coupled to each of the processor and the memory, wherein the processor is configured to:

identify a plurality of features associated with data that is inputted into the model, wherein the plurality of features includes at least a first feature and a second feature, and wherein at least one of the plurality of features include a plurality of levels, each of the plurality of levels corresponding to a differing range of values;

determine a first joint distribution of model outputs and the second feature based on a first level of the first feature and a second joint distribution of model outputs and the second feature based on a second level of the first feature;

compute a bi-causal transport distance between the first joint distribution and the second joint distribution, wherein the bi-causal transport distance indicates conditional demographic disparity with respect to the first feature;

compute, based on the bi-causal transport distance, a regularizer that reduces the conditional demographic disparity by at least applying a penalty parameter; and apply the regularizer to the model to reduce the bi-causal transport distance between the first joint distribution and the second joint distribution for reducing the conditional demographic disparity.

9. The computing apparatus of claim 8, wherein the processor is further configured to calculate a conditional demographic disparity between the first joint distribution and the second joint distribution with respect to the first feature.

10. The computing apparatus of claim 9, wherein the processor is further configured to calculate the conditional demographic disparity by calculating a Kolmogorov distance between the first joint distribution and the second joint distribution.

11. The computing apparatus of claim 8, wherein the processor is further configured to compute the bi-causal transport distance by estimating a nested Wasserstein distance between the first joint distribution and the second joint distribution by applying a Sinkhorn divergence algorithm to a set of samples of each of the first joint distribution and the second joint distribution.

12. The computing apparatus of claim 8, wherein the model is configured to use an artificial intelligence technique for making a decision based on input data that relates to a person, and wherein the decision relates to at least one from among a consumer finance question, a health insurance question, and a hiring question.

13. The computing apparatus of claim 8, wherein the first feature includes at least one from among race, gender, national origin, and disability.

14. The computing apparatus of claim 8, wherein the second feature includes one from among a level of education, a grade point average (GPA), and a level of income.

15. A non-transitory computer readable storage medium storing instructions for optimizing conditional demographic parity in a machine learning model, the storage medium comprising executable code which, when executed by a processor, causes the processor to:

identify a plurality of features associated with data that is inputted into the model, wherein the plurality of features includes at least a first feature and a second feature, and wherein at least one of the plurality of features include a plurality of levels, each of the plurality of levels corresponding to a differing range of values;

determine a first joint distribution of model outputs and the second feature based on a first level of the first feature and a second joint distribution of model outputs and the second feature based on a second level of the first feature;

compute a bi-causal transport distance between the first joint distribution and the second joint distribution, wherein the bi-causal transport distance indicates conditional demographic disparity with respect to the first feature;

compute, based on the bi-causal transport distance, a regularizer that reduces the conditional demographic disparity by at least applying a penalty parameter; and apply the regularizer to the model to reduce the bi-causal transport distance between the first joint distribution and the second joint distribution for reducing the conditional demographic disparity.

16. The storage medium of claim 15, wherein when executed by the processor, the executable code further causes the processor to calculate a conditional demographic disparity between the first joint distribution and the second joint distribution with respect to the first feature.

17. The storage medium of claim 16, wherein when executed by the processor, the executable code further causes the processor to calculate the conditional demographic disparity by calculating a Kolmogorov distance between the first joint distribution and the second joint distribution.

18. The storage medium of claim 15, wherein when executed by the processor, the executable code further causes the processor to compute the bi-causal transport distance by estimating a nested Wasserstein distance between the first joint distribution and the second joint distribution by applying a Sinkhorn divergence algorithm to a set of samples of each of the first joint distribution and the second joint distribution.

* * * * *